(12) United States Patent
Muthiah

(10) Patent No.: US 10,732,878 B1
(45) Date of Patent: Aug. 4, 2020

(54) ENABLING SECONDARY SCRATCHPAD CACHE WITH SOLID-STATE DEVICES FOR LOW COST HOSTS

(71) Applicant: WESTERN DIGITAL TECHNOLOGIES, INC., San Jose, CA (US)

(72) Inventor: Ramanathan Muthiah, Karnataka (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/510,550

(22) Filed: Jul. 12, 2019

(51) Int. Cl.
  *G06F 3/06* (2006.01)
  *G06F 12/02* (2006.01)
  *G06F 12/06* (2006.01)
  *G06F 1/3206* (2019.01)

(52) U.S. Cl.
  CPC ............ *G06F 3/064* (2013.01); *G06F 1/3206* (2013.01); *G06F 3/0658* (2013.01); *G06F 3/0679* (2013.01); *G06F 12/0246* (2013.01); *G06F 12/0253* (2013.01); *G06F 12/06* (2013.01); *G06F 3/0619* (2013.01)

(58) Field of Classification Search
  None
  See application file for complete search history.

(56) References Cited

U.S. PATENT DOCUMENTS

| | | | |
|---|---|---|---|
| 6,920,527 B2 | 7/2005 | Cloutier et al. | |
| 7,136,966 B2 | 11/2006 | Hetrick | |
| 7,490,197 B2 | 2/2009 | Kirshenbaum et al. | |
| 8,639,873 B1 | 1/2014 | Jevans et al. | |
| 8,996,796 B1* | 3/2015 | Karamcheti | G06F 12/121 711/103 |
| 10,459,644 B2* | 10/2019 | Mehra | G06F 3/0679 |
| 2006/0155920 A1* | 7/2006 | Smith | G06F 3/064 711/103 |
| 2007/0271494 A1* | 11/2007 | Gorobets | G06F 11/1068 714/763 |
| 2008/0082728 A1* | 4/2008 | Traister | G06F 12/0246 711/103 |
| 2009/0070748 A1* | 3/2009 | Lin | G06F 11/1441 717/130 |
| 2015/0161052 A1 | 6/2015 | Seong | |
| 2015/0309927 A1 | 10/2015 | Sinclair et al. | |
| 2017/0090762 A1* | 3/2017 | Ea | G11O 29/82 |

* cited by examiner

*Primary Examiner* — Edward J Dudek, Jr.
*Assistant Examiner* — Ralph A Verderamo, III
(74) *Attorney, Agent, or Firm* — Arent Fox LLP

(57) ABSTRACT

One aspect of a storage device includes a non-volatile memory (NVM) comprising a plurality of memory locations each associated with a physical address, where the NVM is configured to store a logical-to-physical (L2P) mapping table associating a logical address with each of the physical addresses of the NVM; and a controller configured to support a scratchpad session by allocating one or more of the memory locations as scratchpad memory for a host, where the controller is further configured to disable updates to the L2P mapping table for the one or more memory locations allocated to the scratchpad memory across power cycles during the scratchpad session.

20 Claims, 6 Drawing Sheets

US 10,732,878 B1

ENABLING SECONDARY SCRATCHPAD CACHE WITH SOLID-STATE DEVICES FOR LOW COST HOSTS

BACKGROUND

Field

This disclosure is generally related to electronic devices and more particularly to storage devices.

Background

Storage devices enable users to store and retrieve data. Examples of storage devices include volatile memory devices and non-volatile memory devices. A non-volatile memory generally retains data after a power cycle, while a volatile memory generally loses data after a power cycle. An example of a non-volatile memory is a flash memory, which may be comprised of NAND cells. Flash memory may be found in solid-state devices (SSDs), Secure Digital (SD) cards, and the like.

A flash storage device may store control information associated with data. For example, a flash storage device may maintain control tables that includes a mapping of logical addresses to physical addresses. These control tables are used to track the physical location of logical sectors, or blocks, in the flash memory. The control tables are stored in the non-volatile memory to enable access to the stored data after a power cycle.

In some implementations, the control tables are maintained in a volatile memory of a controller of a storage device. The storage device may synchronize the control tables at the volatile memory and may periodically flush or merge the control table to a non-volatile memory of the storage device, for example, to back up the control tables.

A host (e.g. a server or other computer system) performing time-critical, complex applications may need a large amount of physical random access memory (RAM) to avoid memory thrashing. Memory thrashing may be caused by insufficient RAM at the host which is available for virtual addressing. Memory thrashing may particularly be problematic for low-cost or cost-effective hosts (for example, laptops, smartphones, digital cameras, etc.) since those devices may not have sufficient RAM to use for complex applications. If free space in the RAM is limited, these low-cost hosts may attempt to swap pages in and out of non-volatile memory, such as flash memory. However, as accessing flash memory is generally much slower than accessing RAM, application thrashing may still occur.

SUMMARY

One aspect of a storage device is disclosed herein. The storage device includes a non-volatile memory comprising a plurality of memory locations each associated with a physical address, where the non-volatile memory is configured to store a logical-to-physical mapping table associating a logical address with each of the physical addresses of the non-volatile memory, and a controller configured to support a scratchpad session by allocating one or more of the memory locations as scratchpad memory for a host, where the controller is further configured to disable updates to the logical-to-physical mapping table for the one or more memory locations allocated to the scratchpad memory across power cycles during the scratchpad session.

One aspect of a method for storing data on a storage device is disclosed herein, the storage device including non-volatile memory having a plurality of memory locations each associated with a physical address. The method includes storing a logical-to-physical mapping table associating a logical address with each of the physical addresses of the non-volatile memory, allocating one or more memory locations of the non-volatile memory as scratchpad memory for a host during a scratchpad session, and disabling updates to the logical-to-physical mapping table for the one or more memory locations allocated to the scratchpad memory across power cycles of the storage device during the scratchpad session.

One aspect of a storage device is disclosed herein. The storage device includes a non-volatile memory comprising a plurality of memory locations each associated with a physical address, where the non-volatile memory is configured to store a logical-to-physical mapping table associating a logical address with each of the physical addresses of the non-volatile memory, means for allocating one or more memory locations of the non-volatile memory as scratchpad memory for a host during a scratchpad session, and means for disabling updates to the logical-to-physical mapping table for the one or more memory locations allocated to the scratchpad memory across power cycles of the storage device during the scratchpad session.

It is understood that other aspects of the storage device and method will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
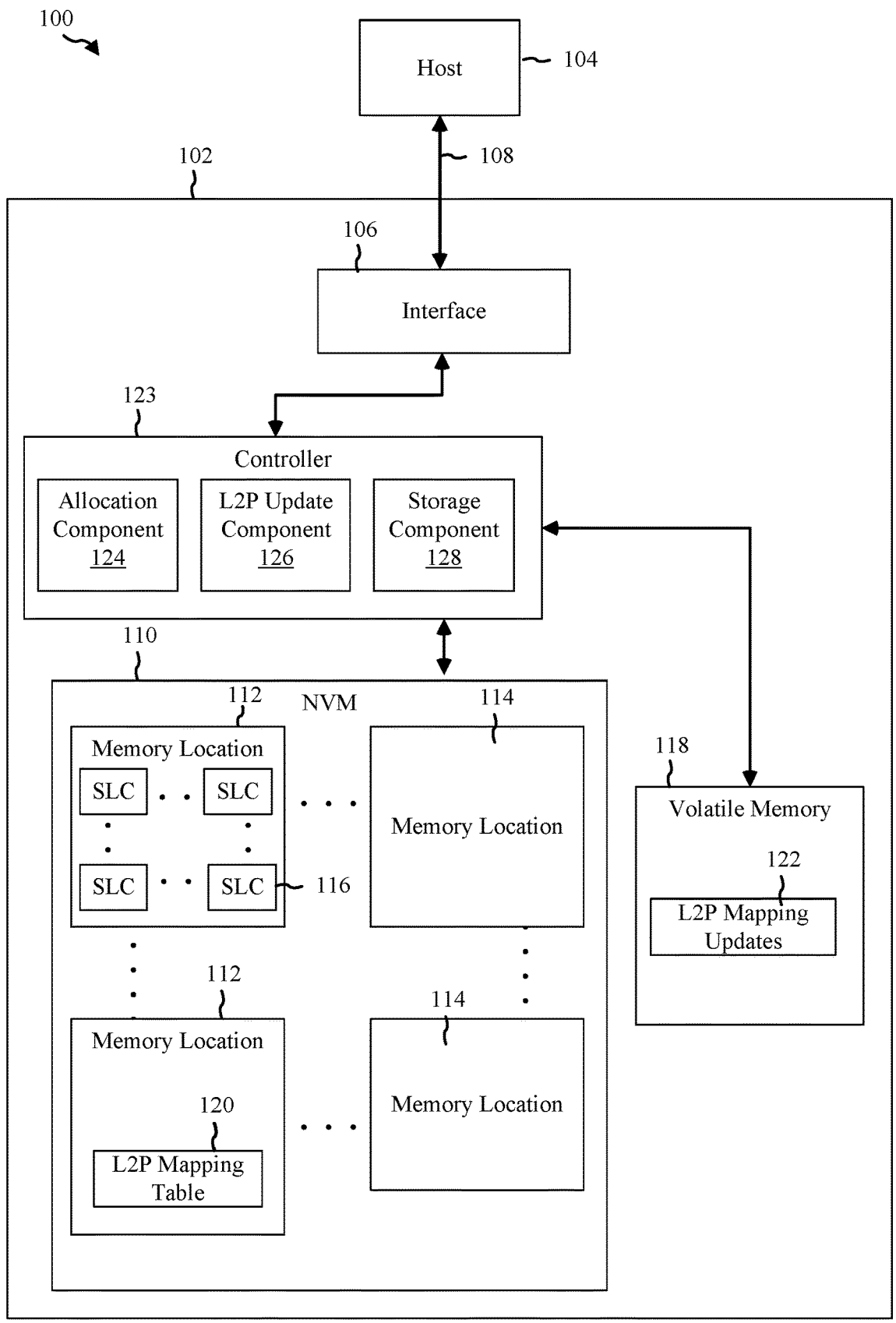
FIG. 1 is a block diagram illustrating an exemplary embodiment of a storage device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The word "exemplary" is used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device and a method for storing data on a storage device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications.

A host may request a storage device, such as a flash storage device, to support a scratchpad session. A scratchpad session may be a mode, setting, or other configuration in which the storage device prevents data stored in one or more memory locations in non-volatile memory (NVM) from being read by the host across power cycles of the storage device, effectively treating those memory locations like volatile memory. In the scratchpad session, a controller of the storage device configures a memory location in NVM to function as a scratchpad, by preventing commitment of data stored in that memory location across power cycles (e.g. like RAM or a scratchpad). The storage device is configured to prevent logical-to-physical (L2P) mapping updates of data stored in this memory location from persisting across power cycles during the scratchpad session. The L2P references of the data from the host are lost after a power cycle, either automatically due to L2P increments in RAM, or voluntarily through losing references from L2P updates in NVM, causing the data stored in that memory location to be invalidated and allowing new data to be written without the need to perform garbage collection for that memory location. During support of the scratchpad session, the storage device may operate normally with respect to the other memory locations (e.g. as NVM), allowing data stored in those locations to persist across power cycles.

FIG. 1 shows an exemplary block diagram 100 of a storage device 102 which communicates with a host 104 according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, host 104 may be located remotely from storage device 102. Although FIG. 1 illustrates that the host 104 is shown separate from the storage device 102, the host 104 may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with storage device 102.

Host interface 106 is configured to interface storage device 102 with host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS). Alternatively, the host interface 106 may be wireless, and may interface the storage device 102 with host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), or Wireless Personal Area Network (WPAN) technology.

As shown in the exemplary embodiment of FIG. 1, storage device 102 includes non-volatile memory (NVM) 110 for non-volatilely storing data across power cycles. NVM 110 can include, for example, flash integrated circuits, NAND memory (e.g., single-level cell (SLC) memory, multi-level cell (MLC) memory, triple-level cell (TLC) memory, or any combination thereof), or NOR memory. NVM 110 may include a plurality of memory locations 112 which may store system data for operating the storage device 102 or user data received from the host for storage in the storage device 102. For example, NVM may have a cross-point architecture including a 2-D NAND array of memory locations 112 including n rows and m columns, where m and n are predefined according to the size of the NVM. In the illustrated exemplary embodiment of FIG. 1, each memory location 112 may be a block 114 including multiple SLCs 116. Other examples are possible; for instance, each memory location may include multiple blocks, and each block may include SLCs, MLCs, and/or TLCs. Moreover, each memory location may include one or more blocks in a 3-D NAND array.

Storage device 102 also includes a volatile memory 118 that can, for example, include a Dynamic Random Access Memory (DRAM). Data stored in volatile memory 118 can include data read from NVM 110 or data to be written to NVM 110. In this regard, volatile memory 118 can include a write buffer and a read buffer for temporarily storing data.

In operation, the NVM 110 stores a logical-to-physical (L2P) mapping table 120 for the storage device 102. The L2P mapping table 120 stores the mapping of logical addresses specified for data written from the host 104 to physical addresses in NVM 110 indicating the location(s) where the data is stored. This mapping may be performed by a controller 123 of the storage device. As discussed in more detail below with reference to FIG. 2, the L2P mapping table may be a table or other data structure which includes an identifier associated with each memory location 112 in NVM where data is stored. While FIG. 1 illustrates a single L2P mapping table 120 stored in one of the memory locations 112 of NVM, this is merely an example; the L2P mapping table 120 may include multiple tables stored in one or more memory locations of NVM.

The volatile memory 118 also stores L2P mapping updates 122 (also referred to as incremental updates) for the storage device 102. The L2P mapping updates 122 are entries showing the mapping of logical addresses specified for data written from the host 104 to physical addresses in NVM 110 indicating the location(s) where the data is stored. This mapping may be performed by the controller 123. As discussed in more detail below with reference to FIG. 3, the L2P mapping updates 122 may be stored in the form of a table or other data structure which includes a logical block address (LBA) associated with each memory location 112 in NVM where data is being stored.

As shown in FIG. 1, storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

Controller 123 is shown with modules or components, e.g. an allocation component 124, a L2P update component 126, and a storage component 128. The controller 123 may include an allocation component 124 which is configured to allocate one of the memory locations 112 for storing data received from the host 104 in response to a write command by the host 104. For example, referring to FIG. 1, the allocation component 124 may allocate one or more SLCs 116 in block 114 (e.g. memory location 1) to store the data. The controller 123 may also include a L2P update component 126 which is configured to store L2P mapping updates 122 in the volatile memory 118. For example, the L2P update component 126 may store an update to the logical-to-physical address mapping of the data received from host 104 in the volatile memory 118. The controller 123 may also include a storage component 128 which is configured to store the data received from host 104 in the allocated memory location. For example, the storage component 128 may store the data in the SLCs 116 of block 114 previously allocated by the allocation component 124.

Each component may be implemented with embedded software that is used by the one or more processors to perform the various functions of the controller 123 described throughout this disclosure. Alternatively, software for implementing each of the components may be stored in the NVM 110 or in a memory external to the storage device 102, and may be accessed by the controller 123 for execution by the one or more processors of the controller 123. Alternatively, the components may be implemented with hardware in the controller 123, or may be implemented using a combination of the aforementioned hardware and software.

In default operation, the host 104 stores data in storage device 102 by sending a write command to the storage device 102 specifying one or more logical addresses (e.g., LBAs) associated with the data. The interface 106 receives the write command and the controller 123 allocates a memory location 112 in the NVM 110 of storage device 102 (e.g. via allocation component 124) for storing the data. The controller 123 updates the L2P mapping in volatile memory 118 and subsequently merges the updates to NVM (e.g. using L2P update component 126) to map a logical address associated with the received data to the physical address of the memory location 112 allocated for the data. The controller 123 stores the data in the memory location 112 (e.g. via storage component 128).

The host 104 may retrieve data from the storage device 102 by sending a read command specifying one or more logical addresses associated with the data to be retrieved from storage device 102. The interface 106 receives the read command, and the controller 123 accesses the L2P mapping in volatile memory 118, or from L2P tables in the NVM if unavailable in volatile memory, to translate the logical addresses specified in the read command to the physical addresses indicating the location of the data. The controller 123 then reads the requested data from the memory location 112 specified by the physical addresses, and returns the read data to host 104 via host interface 126.

Figure 2:
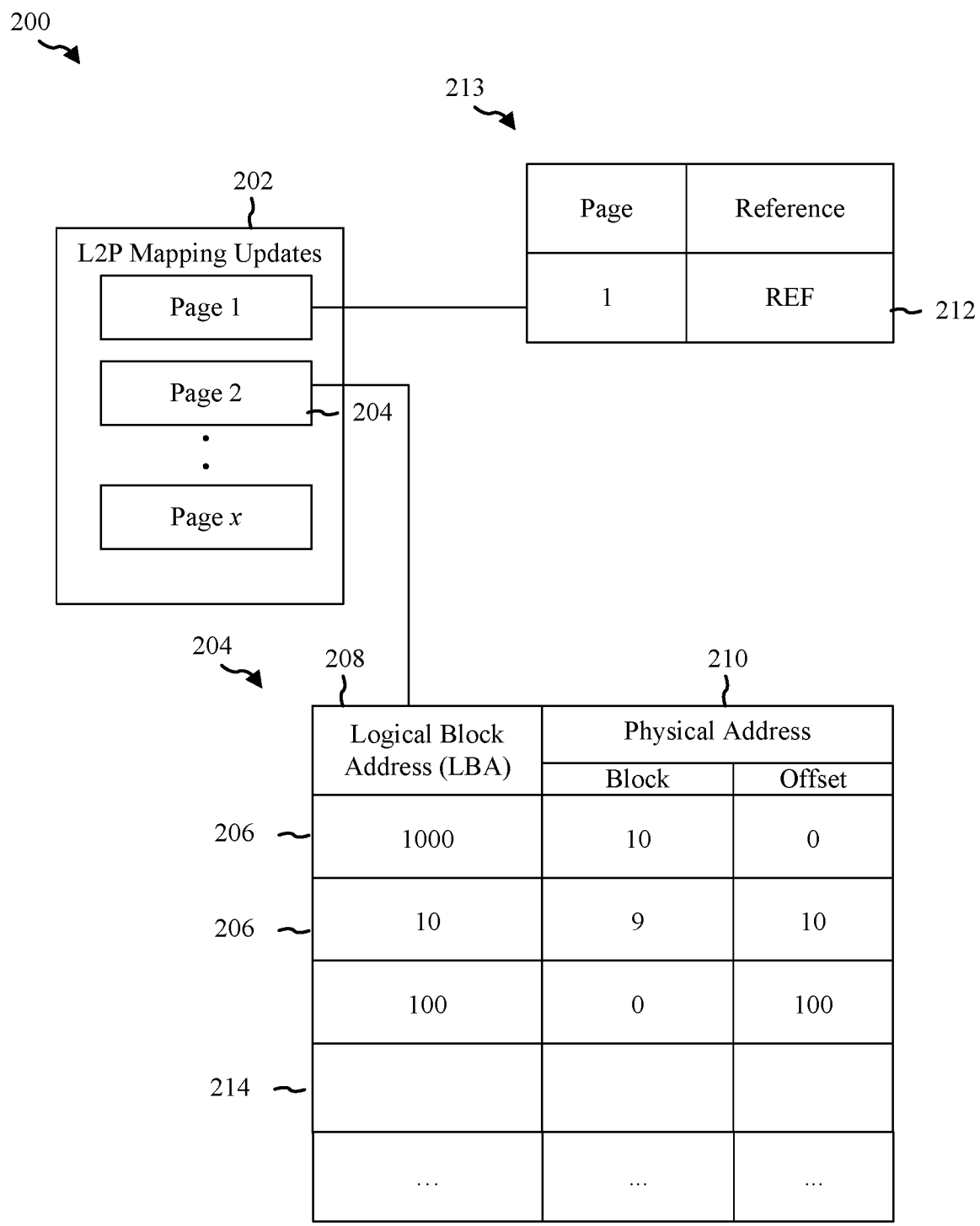
FIG. 2 is a conceptual diagram illustrating an example of logical-to-physical mapping updates in a volatile memory of the storage device of FIG. 1.

FIG. 2 is a conceptual diagram 200 illustrating an example of L2P mapping updates 202 in the volatile memory of FIG. 1. L2P mapping updates 202 may correspond to L2P mapping updates 122 or incremental updates in FIG. 1. Incremental updates are L2P mapping updates or entries that are stored in the volatile memory and may be associated with one or more pages. In one exemplary embodiment, the L2P mapping updates 202 may include a plurality of pages 204 (e.g. pages 1 to x, where x is may be predefined according to a size of the volatile memory). Each page 204 may include one or more entries 206 identifying a logical block address (LBA) 208 and a physical address 210 associated with data to be written to the NVM. LBA 208 may be a logical address specified in a write command for data received from a host. Physical address 210 may indicate the block and the offset at which the data associated with LBA 208 is physically written. Thus, an incremental update may be an entry 206, a set or subset of entries in a page 204, or a set or subset of entries from multiple pages 204.

In one embodiment, pages 204 may be swapped from volatile memory to the NVM due to lack of cache (e.g., page 1 in FIG. 2). When swapping occurs, these pages 204 may be associated with a reference 212 stored in a log table 213 (e.g. a Master Table or a master index page (MIP) block). When the controller receives a read command from the host specifying a LBA associated with a page which was swapped out of volatile memory, reference 212 may assist the controller in identifying the page 204 which was swapped. For example, FIG. 2 illustrates a non-limiting example where page 1 was previously swapped into NVM to free up space in the volatile memory. Additionally, in some exemplary embodiments, certain pages may have blank entries (e.g. entry 214) to leave space for the controller to update LBA and physical address information.

Figure 3:
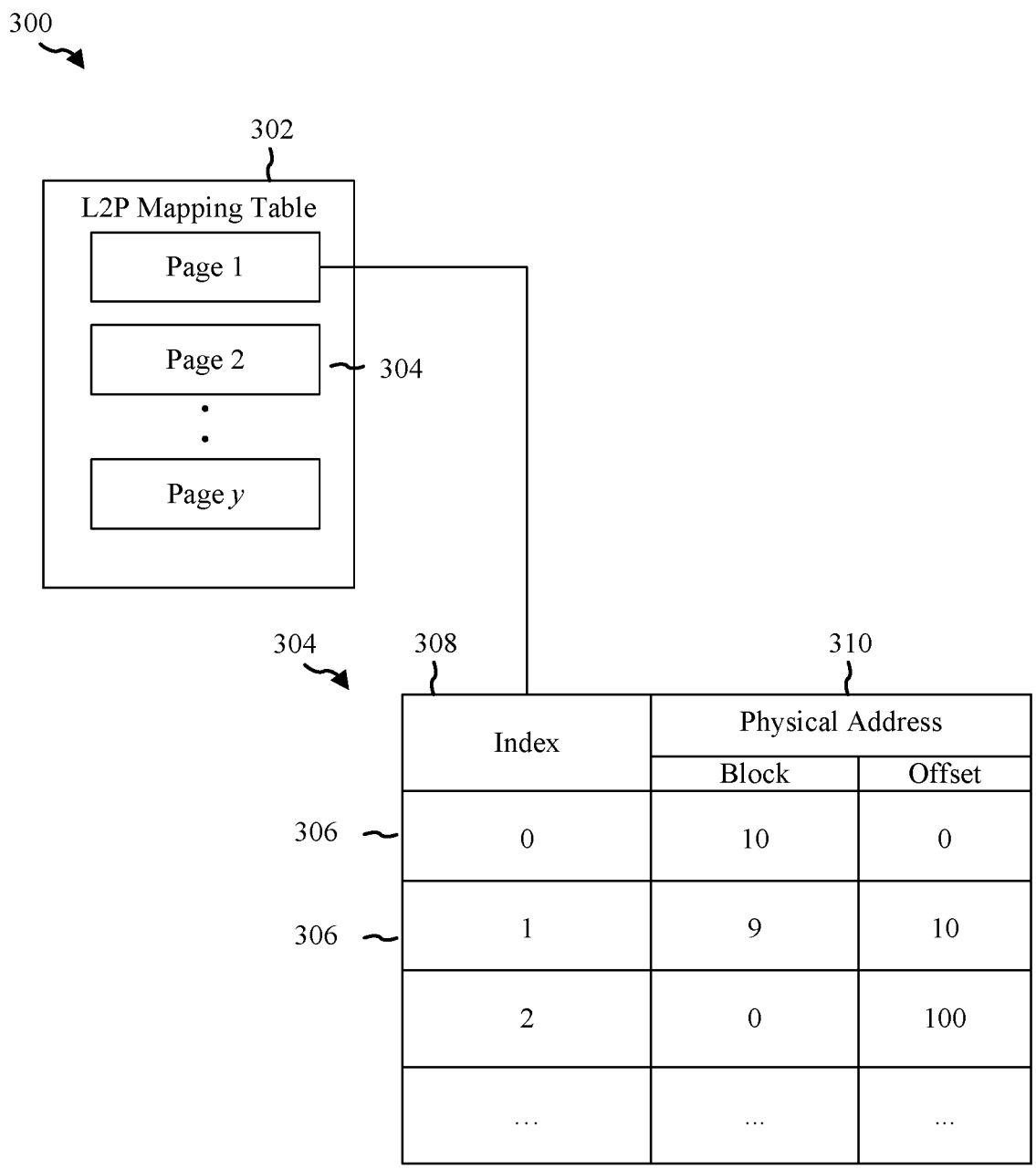
FIG. 3 is a conceptual diagram illustrating an example of a logical-to-physical mapping table in a non-volatile memory of the storage device of FIG. 1.

FIG. 3 is a conceptual diagram 300 illustrating an example of an L2P mapping table 302 in the NVM 110 of FIG. 1. L2P mapping table 302 may correspond to L2P mapping table 120 in FIG. 1. In one exemplary embodiment, the L2P mapping table 302 may include a plurality of pages 304 (e.g. pages 1 to y, where y is predefined according to a size of the L2P mapping table). Each page 304 may include one or more entries 306 identifying an index 308 and a physical address 310 associated with data to be written to the NVM. Index 308 may be associated with one or more LBAs in a range of LBAs; for example, index 0 may be associated with LBAs 0-7, index 1 may be associated with LBAs 8-15, etc. Physical address 310 may indicate the block and the offset at which the data associated with index 308 is written.

Referring back to FIGS. 1-3, in default operation of the storage device 102, when a write command is received, the controller 123 stores L2P mapping update 122, 202 in the volatile memory 118. As data to be written is received from host 104 over interface 106, new updates or entries 206 are created in the volatile memory 118. If the volatile memory 118 later becomes full (e.g. due to limited cache), the controller 123 may swap a portion of the L2P mapping updates 122, 202 into one or more memory locations 112 of the NVM 110 to free up space in the volatile memory 118.

The controller 123 may also store a reference 212 in volatile memory 118 associated with the swapped portion in the NVM 110 so that the controller can identify the location of the page in NVM when searching for it in volatile memory after a read command. Before the storage device powers down, the L2P mapping updates 122, 202 in the volatile memory 118 and the NVM 110 as well as references 212 are flushed to or merged with the L2P mapping table 120, 302 in the NVM. Thus the written data in the NVM is maintained and can be read across power cycles of the storage device 102.

While hosts may write data to and read data from the storage device 102 based on the default operation as described above, the process may be too slow for low-cost hosts which require additional memory to perform time-critical, complex applications to avoid memory thrashing. Therefore, in one exemplary embodiment, the controller may configure the storage device to support a scratchpad session to prevent memory thrashing. In particular, the allocation component 124 of controller 123 may allocate a region or namespace of the NVM 110 (e.g. a memory location 112) for scratchpad use, in response to an instruction received from the host to start a scratchpad session. Moreover, when the storage device 102 is powered down or the controller 123 receives an instruction from the host 104 to end the scratchpad session, the controller 123 does not merge the L2P mapping updates 122, 202 associated with the allocated logical region(s) (in the volatile memory 118) to the L2P mapping table 120 (in the NVM 110). Instead, the controller 123 allows the updates 122, 202 that were stored in volatile memory 118 to be discarded. Additionally, any references to updates 122, 202 that were swapped from the volatile memory 118 into NVM 110 (due to limited cache) are also discarded without merging into the L2P mapping table 120, 302, thereby invalidating any associated data stored in that region of the NVM 110.

Moreover, when the limited cache of the volatile memory 118 is full, the controller does not merge the L2P mapping updates 122, 202 with the L2P mapping table 120, 302 in the NVM 110. Instead, the controller 123 flushes one or more portions of the L2P mapping updates 202 (e.g. entries 206 or pages 204) to the NVM to be stored in one or more of the allocated memory location(s) 112. For example, the L2P mapping updates 122, 202 may be written to a memory location 112 or control block exclusively allocated for the L2P mapping updates 122, 202. After the scratchpad session ends, the L2P mapping updates 122, 202 in the memory location 112 are invalidated in response to a firmware data update, since the updates are never merged into the L2P mapping table 120, 302. As a result, the controller 123 may determine to write data or L2P mapping updates to the memory location 112 or block allocated for scratchpad memory using a trim command, which allows information to be written with lower latency although at a cost of endurance of the block, since the host 104 does expect the block to retain the stored information across power cycles. Additionally, when the controller 123 receives an instruction from the host 104 to end the scratchpad session, the controller 123 may conveniently erase the data stored in the allocated block(s) for scratchpad memory, and can subsequently reuse the memory location 112 for future scratch pad sessions.

Thus, by disabling the merging of L2P mapping updates 122, 202 to the L2P mapping table 120, 302 for the allocated memory location(s) to scratchpad memory, page compaction may be avoided, scratchpad performance may be increased, and overhead may be reduced. This result is particularly beneficial for low-cost storage devices with smaller caches.

As the L2P mapping updates 122, 202 associated with scratchpad memory are maintained separately from the L2P mapping table 120, 302 without merging, the available free memory in the NVM 110 for data remains unchanged after the scratchpad session ends.

Accordingly, in the described exemplary embodiment, the allocation component 124 of controller 123 provides a means for allocating one or more memory locations of the NVM as scratchpad memory for a host during a scratchpad session. The allocation component 124 may be implemented using the above-described, one or more processors of controller 123. In one implementation, in response to a command from the host 104 to start the scratchpad session, the interface 106 may provide a trigger to the allocation component 124. Based on this trigger, the allocation component 124 may determine one or more memory locations 112 to be used for scratchpad memory. For example, the allocation component 124 may access the L2P mapping table 120, 302 and identify the block(s) for which there are no entries 306 in the L2P mapping table 302 (indicating the blocks or memory locations 112 that are currently unused). In another example, one or more memory locations 112 may be predefined as scratchpad memory and their addresses or other identifier stored in NVM 110, and the allocation component 124 may identify one of these memory locations 112 from the predefined identifiers. In another example, the command from the host 104 may include a logical address for a memory location, and the allocation component 124 may determine the memory location to be used for scratchpad memory from this address. The allocation component 124 may store the address or other identifier for the determined memory location(s) for look-up in the NVM 110 or volatile memory 118.

Moreover, the storage component 128 of controller 123 provides a means for storing incremental updates in the volatile memory and in a separate region of the NVM without merging the incremental updates to the L2P mapping table. The storage component 128 may be implemented using the above-described, one or more processors of controller 123. In one implementation, in response to a command from the host 104 to write data, the interface 106 may provide data and a logical address for writing the data to the storage component 128 (either directly or via allocation component 124). In response, the storage component 128 creates or stores an entry 206 (e.g. an incremental update) for the mapping in volatile memory 118. For example, the storage component 128 may identify a physical address 210 for the received logical address 208 from L2P mapping table 302. If there is available space in the volatile memory 118, the storage component 128 stores that information as an entry 206 in the volatile memory 118. If the volatile memory 118 is full, the storage component 128 stores that information as an entry 206 after swapping one or more pages 204 from the volatile memory 118 into the NVM 110 and storing a reference 212 associated with each swapped page 204 in the log table 213. The storage component may then transmit the physical address 210 along with the data to the NVM 110.

Furthermore, the L2P update component 126 of controller 123 provides a means for disabling updates to the L2P mapping table for the one or more memory locations allocated to the scratchpad memory across power cycles of the storage device during the scratchpad session. The L2P update component 126 may be implemented using the above-described, one or more processors of controller 123. In one implementation, in response to a command from the host 104 to end the scratchpad session or power down the storage device 102, the interface 106 may provide a trigger to the L2P update component 126 (either directly or via the allocation component 124). Based on this trigger, the L2P update component 126 leaves the entries 206 in volatile memory 118 that were allocated for scratchpad memory without merging them into the L2P mapping table 120, 302 in NVM 110. For example, the L2P update component 126 may receive the logical address of the one or more memory locations 112 allocated for scratchpad memory from the allocation component 124. The L2P update component 126 may then access the L2P mapping updates 202 in the volatile memory 118 and identify the entries 206 whose logical block addresses 208 match the received logical address (indicating those entries correspond to scratchpad memory). The L2P update component 126 may then leave those identified entries 206 in the volatile memory 118, while flushing the other entries 206 (not associated with scratchpad memory) into NVM 110 to be merged with L2P mapping table 302.

The L2P update component 126 of controller 123 also disables incremental updates from being merged with the L2P mapping table and one or more references associated with the incremental updates from being stored in the NVM across power cycles during the scratchpad session. In one implementation, based on the aforementioned trigger received from the interface 106 to end the scratchpad session or power down the storage device 102, the L2P update component 126 leaves the entries 206 (e.g. incremental updates) in volatile memory 118 that were allocated for scratchpad memory without merging them into the L2P mapping table 120, 302 in NVM 110, as described above. Moreover, the L2P update component 126 leaves any references 212 associated with these incremental updates without merging them into the L2P mapping table 120, 302. For example, when the L2P update component 126 receives the logical address of the one or more memory locations 112 allocated for scratchpad memory from the allocation component 124, the L2P update component 126 may access the log table 213 and identify any references 212 of pages 204 swapped to NVM 110. The L2P update component 126 may then identify the entries 206 associated with those pages 204 in the NVM whose logical block addresses 208 match the received logical address (indicating those entries and associated references correspond to scratchpad memory). The L2P update component 126 may then leave the associated references 212 in the volatile memory 118, while flushing the other references 212 (not associated with scratchpad memory) into L2P mapping table 102, 302. As the references 212 left in volatile memory will be lost across power cycles, the identified entries 206 in the NVM associated with these references (corresponding with scratchpad memory) will not be merged with the L2P mapping table 120, 302, thus becoming lost as well.

The aforementioned functions performed by each of the components are not limited to the specific components described, but may be implemented by different components or other components of controller 123.

Figure 4:
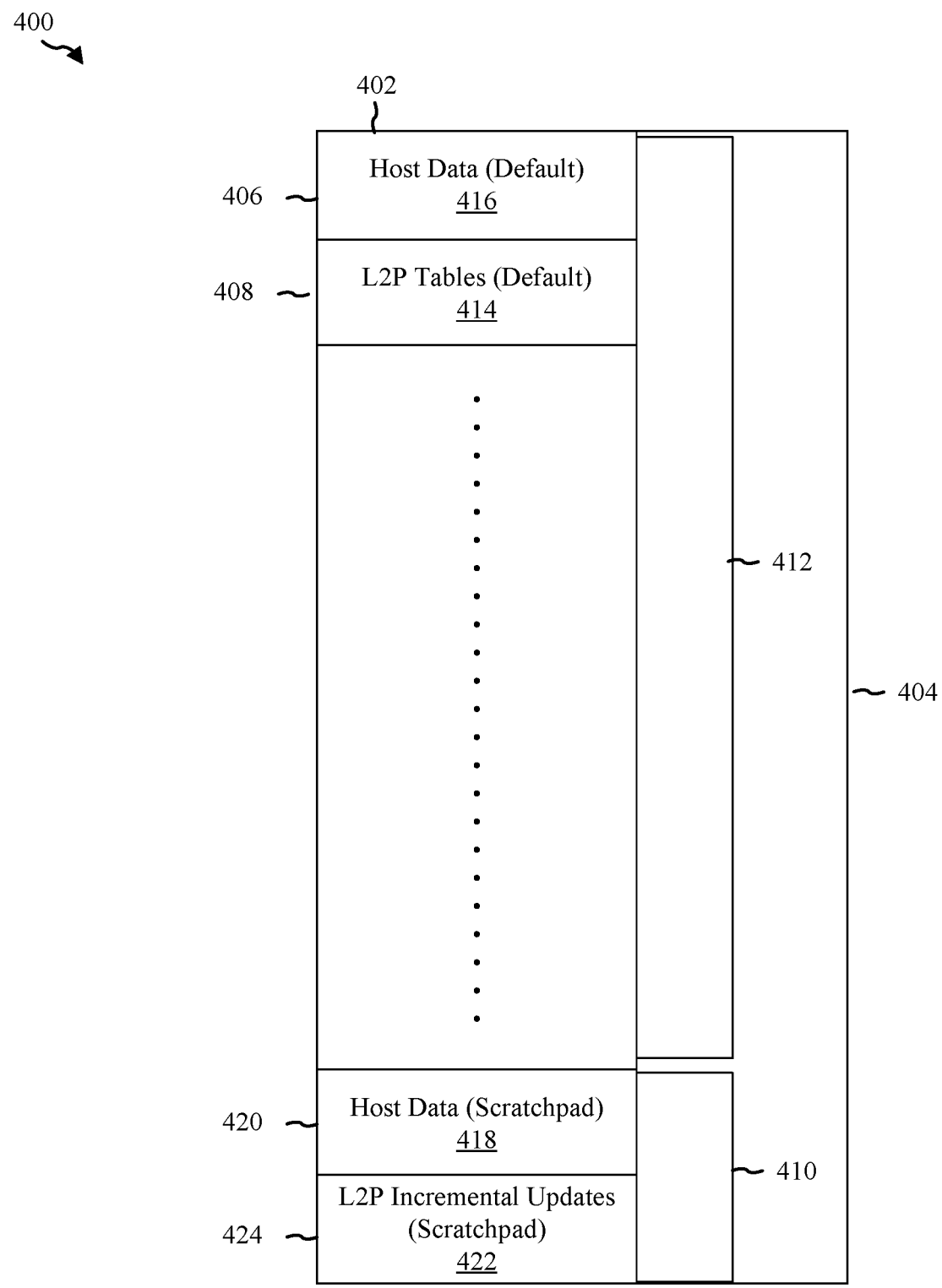
FIG. 4 is a conceptual diagram illustrating an example of non-volatile memory operation in the storage device of FIG. 1 with support for a scratchpad session.

FIG. 4 is a conceptual diagram 400 showing an example of NVM operation in a storage device supporting scratchpad sessions. The NVM 402 may correspond to NVM 110 in FIG. 1. In one exemplary embodiment, the NVM 402 may include a plurality of memory locations 404 each associated with a physical address. For example, referring to FIG. 3, memory location 406 may be a block associated with the physical address 310 corresponding to index 0, while memory location 408 may be a block associated with the physical address 310 corresponding to index 1. To support a scratchpad session, the controller (e.g. controller 123 in FIG. 1) may allocate one or more of these memory locations 404 as scratchpad memory 410 for the host, while leaving the remaining NVM memory locations 412 as default, non-volatile memory.

The NVM 402 may store one or more L2P mapping tables 414 (e.g. L2P mapping table 120, 302) in one or more of the NVM memory locations 412. For example, FIG. 4 illustrates L2P mapping tables 414 stored in memory location 408. In default operation, when a host (e.g. host 104) sends a command to the controller (e.g. controller 123) to write data to NVM 402, the controller may store the data in one or more of the NVM memory locations 412 allocated for non-volatile data storage. For instance, as illustrated in FIG. 4, the host data may be stored in memory location 406. L2P mapping updates (e.g. 122, 202) created in volatile memory which are associated with this data are later flushed to the L2P mapping tables 410 (e.g. L2P mapping table 120, 302) in default operation.

In one exemplary embodiment, after the controller (e.g. controller 123) receives an instruction from the host to start a scratchpad session, the controller may receive data from the host specifying a logical address (e.g. LBA) associated with the scratchpad memory 410. As a result, the controller stores the host data 418 in the allocated scratchpad memory, for example, in memory location 420. The controller also stores incremental updates to the L2P mapping table (e.g. entries 206 in FIG. 2) in the volatile memory. However, the controller disables these incremental updates for the scratchpad memory 410 from being flushed to or merged with the L2P mapping tables 414 during the scratchpad session, and therefore from being stored in the NVM 402 across power cycles of the storage device.

Moreover, the controller (e.g. controller 123) is configured to store incremental updates 422 (e.g. entries 206 in FIG. 2) in the NVM 402, without updating the L2P mapping table(s) 414. For example, if the volatile memory 118 of FIG. 1 later becomes full (e.g. due to limited cache), the controller may swap/move or store a portion of the L2P mapping updates 122, 202 into one of the memory locations of the NVM 402 allocated as scratchpad memory 410, in order to free up space in the volatile memory. The portion of L2P mapping updates being moved may be incremental updates 422 with LBAs corresponding to memory location 420 or some other location in scratchpad memory 410. In one exemplary embodiment, the controller may store the incremental updates in a memory location exclusively for L2P mapping updates, for example, L2P incremental update region 424 in FIG. 4. For example, the controller may store host data 418 and the incremental updates 422 in separate blocks of the NVM (e.g. memory locations 420 and 424, respectively) until an end of the scratchpad session without updating the L2P mapping table(s) 414. Additionally or alternatively, the controller may store the updates in other memory locations including those shared with host data (e.g. memory location 416). In some exemplary embodiments, the controller may store the incremental updates in a different memory location (for example, a different block) than the L2P mapping table 414.

In one exemplary embodiment, the controller may be configured to store the data 418 and incremental updates 422 in multiple SLCs of the NVM 402. For example, referring to FIG. 1, memory locations 420 and 424 may each include a plurality of SLCs 116, and the data 418 and incremental updates 422 may be stored in these SLCs.

For each of the incremental updates 422 moved by the controller to the NVM 402, the controller may be configured to store a reference associated with each of the incremental updates solely in the volatile memory. For example, the controller may store a reference 212 in volatile memory (see, e.g., FIG. 2) associated with the incremental updates 422 moved into L2P incremental update region 424. The reference may be stored solely in the volatile memory (e.g. volatile memory 118 of FIG. 1), and enables the controller to identify the location of the swapped page in NVM.

In one exemplary embodiment, the controller may be configured to disable these references 212 from being stored in the NVM across power cycles. In default operation, the controller may store these references 212 in the log table 213, which is subsequently flushed to the L2P mapping table 414 along with the incremental updates in volatile memory, to prevent their loss across power cycles. However, during the scratchpad session, the controller does not store into L2P mapping table 414 the references 212 associated with the incremental updates 422 (e.g. moved into scratchpad memory 410). As a result, these references in volatile memory will be lost, which in turn will prevent the controller from being able to identify the location of the incremental updates 422. This invalidation of the incremental updates 422 stored in the scratchpad memory 410 effectively causes the updates themselves to be lost, which in turn will prevent the controller from being able to identify the host data 418 based on the updates (thus invalidating host data 418 as well).

In one exemplary embodiment, the volatile memory may include a plurality of pages (e.g. pages 204 in FIG. 2), and the controller is configured to leave space for incremental updates to the L2P mapping table in each of the pages. For example, the controller may optionally leave blank entries in certain pages (e.g. entry 214) empty for the controller to store incremental updates. In this way, the controller may be able to more easily insert newer commands or entries for a page to expand, without disturbing other pages in volatile memory. The controller may also move the incremental updates in multiple pages at a time to the NVM 402 (for example, the controller may swap at least two of pages 204 at once to incremental L2P update region 424) when the incremental updates to the L2P mapping table exceed the available volatile memory.

As a result, the controller may be configured to refrain from performing garbage collection during the scratchpad session. Since the L2P mapping updates (e.g. incremental updates 422) in volatile memory and NVM are not merged with the L2P mapping table 414 and are allowed to be discarded across power cycles, the L2P mapping tables 414 in NVM are unaffected by data written into the scratchpad memory 410. Any data and/or L2P updates which are written to the NVM are invalidated as described above. Thus, the separately allocated scratchpad memory 410 and can be used and rewritten multiple times during subsequent scratchpad sessions without any changes to the L2P mapping table 414, eliminating the need for the controller to perform garbage collection in connection with the scratchpad memory 410. However, if garbage collection becomes required during the scratchpad session (e.g. due to simultaneous default operation in memory location 406), the controller may be configured to only perform garbage collection on memory locations associated with logical ranges outside those of scratchpad memory 410.

In some exemplary embodiments, the controller may be further configured to support the scratchpad session in a low power mode. In certain cases, the storage device may operate in a low power mode (for example, Deep Power Down Mode (DPDM) or other low power or sleep modes) in response to a command from the host (e.g. when the host does not expect to store data in the NVM in the near future). However, the controller may still be provided with sufficient power to support a scratchpad session during such low power modes. In such case, while the controller may refrain or limit the writing of data to the memory locations 412 associated with non-volatile memory in default operation during a low power mode, the controller may continue to store data 418 and incremental updates 422 (in volatile memory and NVM) using scratchpad memory 410 as described above. The availability of data in volatile memory remains the same. However, if power is planned to be completely removed from the storage device, the controller may read the host data 418 (and possibly the incremental updates 422) so it can be saved into the cache of the host.

Figure 5:
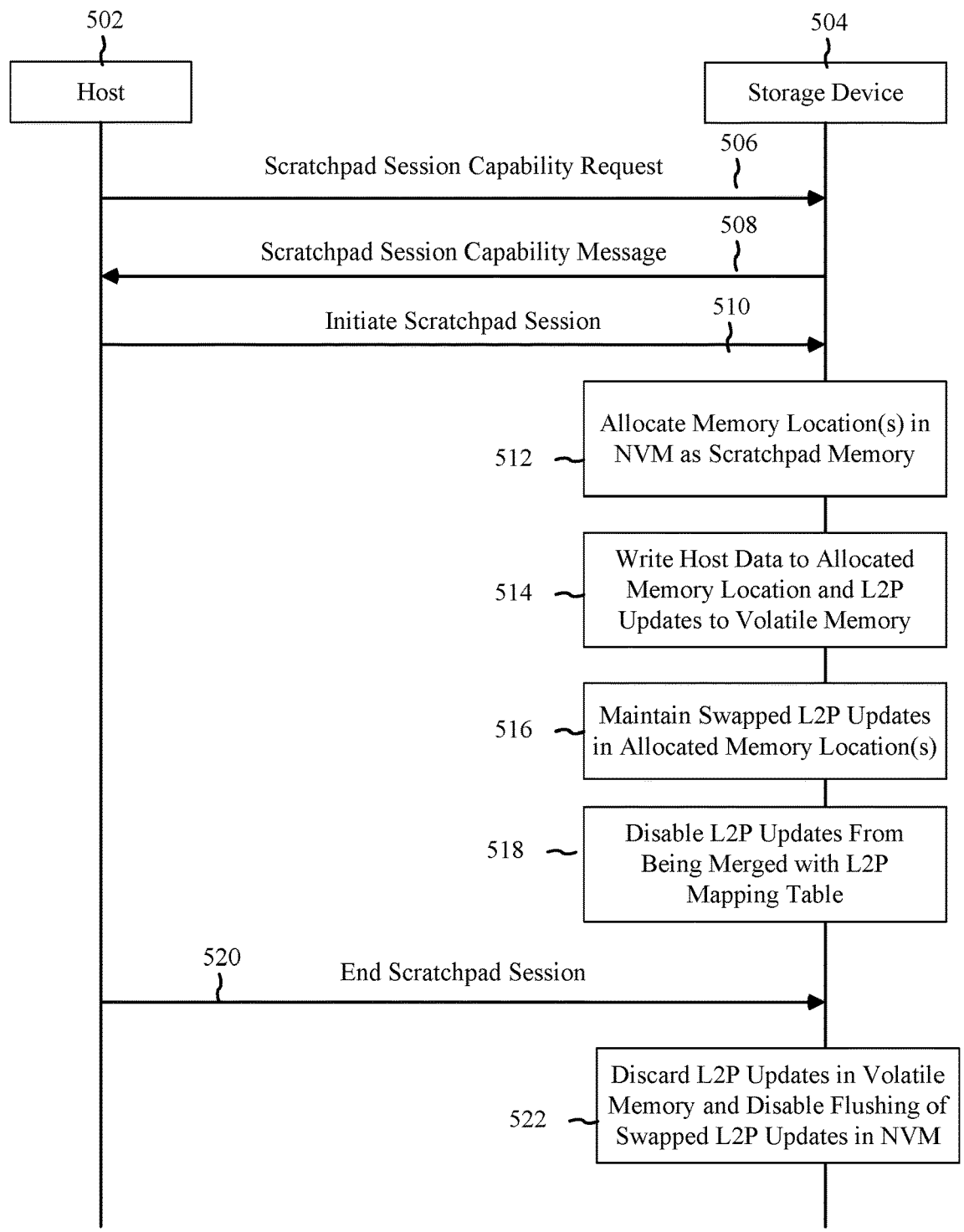
FIG. 5 is a flow diagram illustrating an example of communication flow between a host and a storage device according to an exemplary embodiment.

FIG. 5 illustrates a flow diagram 500 illustrating an example of communication flow between a host 502 (e.g. host 104 of FIG. 1) and a storage device 504 (e.g. storage device 102 of FIG. 1) to support a scratchpad session. In one exemplary embodiment, a host may send a scratchpad session capability request 506 to the storage device requesting the storage device to confirm whether it is capable of supporting a scratchpad session. The storage device (e.g. via controller 123 in FIG. 1) subsequently sends a scratchpad session capability message 508 to the host. The message may indicate whether the storage device does or does not have the capability of supporting a scratchpad session. If the storage device indicates that it is not scratchpad-capable, the host communicates with the storage device according to default operation only.

If the storage device 504 indicates that it is scratchpad-capable, the host 502 may send a message to the storage device to initiate the scratchpad session 510. In response to the starting of the scratchpad session, the storage device may operate as described above with respect to FIG. 4. For instance, at block 512, the storage device may allocate one or more memory location(s) in the NVM as scratchpad memory. Moreover, at block 514, the storage device may write host data to the allocated memory location(s) and incremental updates (L2P mapping updates) associated with the host data to the volatile memory. If the volatile memory becomes full, then at block 516, the storage device may swap and maintain incremental updates in the allocated memory location(s). Furthermore, at block 518, the storage device disables the incremental updates from being merged with the L2P mapping table in the NVM.

The host 502 may later send a message to the storage device 504 to end the scratchpad session 520. Alternatively, the storage device may be fully powered down. Accordingly, as described above with respect to FIG. 4, the storage device discards the L2P updates in the volatile memory and disables flushing of any swapped L2P updates in the NVM. For example, the controller of the storage device does not merge or flush any incremental updates associated with scratchpad memory to the L2P mapping tables of the NVM. The host may subsequently communicate with the host according to default operation until it sends another message to initiate the scratchpad session, by which the aforementioned process repeats.

An example configuration of a storage device supporting a scratchpad session is hereafter described with reference to FIGS. 1-5. In one example, when initiating the scratchpad session 510, the host 502 may instruct the storage device 504 to treat one logical region or memory location having a predetermined size as scratchpad memory (e.g. 1 GB). The host and storage device may be low-cost devices; thus, in this example, the storage device 504 may have only 64 KB of RAM in its volatile memory 118, although other sizes and types of volatile memory 118 may be used in other examples. In one example, each page 204 in FIG. 2 may be 4 KB, and the size of each entry 206 in FIG. 2 may be 8 bytes.

All the volatile memory 118 in the storage device (e.g. all 64 KB in this example) may be used for L2P mapping updates 202. Thus, 16 pages having sizes of 4 KB may be used, and assuming each entry is 8 bytes, each page may contain 512 entries and a total of 8192 entries can be managed in the volatile memory 118. In one example, the entries may be arranged in ascending logical order for binary searching and updating.

Once the volatile memory is full (e.g. all 8192 entries are created in the volatile memory 118), new pages may be created and cached in areas of the volatile memory that are made available by swapping out existing pages to the NVM 110. When swapping in and swapping out existing pages, a reference (e.g. reference 212 in FIG. 2, for example, the beginning and last logical region of a page) can be cached in a log or master table to enable the controller to easily search for pages in response to read commands or rewrite commands. For example, when the controller receives a read command from the host, device performance may be optimized since only pages 204 need to be swapped in and out as opposed to pages 304 in the larger L2P mapping table 302.

Some space in each page may be optionally left free before any swapping in and out to enable the controller to more easily insert newer commands or entries in the volatile memory 118, thus allowing the page to expand without disturbing other pages in the volatile memory. When the volatile memory 118 overflows, multiple pages may be sensed, updated and flushed to the NVM 110. Moreover, multiple pages may be dynamically linked, inserted, and deleted in the NVM (for example, during swapping using reference 212). At various times, the storage device may include at least some pages in volatile memory, while others would be in memory locations 112 (for example, NAND blocks) of the NVM 110.

When the controller receives a write command from the host, the controller may sense the page in the NVM and update and re-program the page if it is not already cached among the entries in the volatile memory. If the controller does not identify the memory location in the volatile memory, the controller may append the page to the volatile memory in response to the write command.

Figure 6:
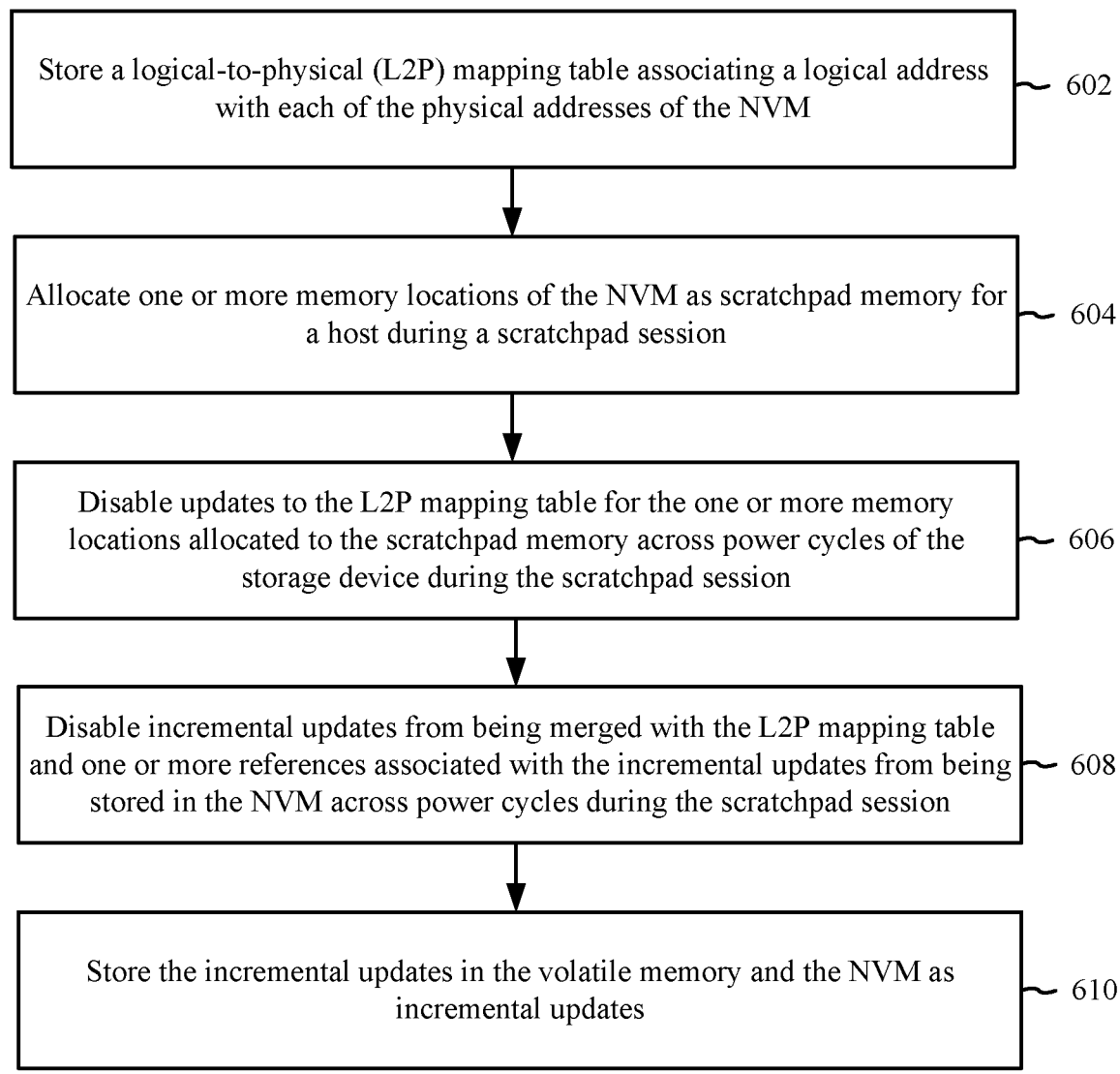
FIG. 6 is a flow chart illustrating an exemplary embodiment for storing data on a storage device supporting a scratchpad session.

FIG. 6 is a flowchart 600 illustrating an exemplary embodiment of a method for storing data on a storage device supporting a scratchpad session, where the storage device includes a NVM having a plurality of memory locations each associated with a physical address. For example, the data storage method can be carried out in a storage device 102, such as the one illustrated in FIG. 1. Each of the steps in the flow chart can be controlled using the controller as described below (e.g. controller 123), or by some other suitable means.

As represented by block 602, the controller stores a logical-to-physical (L2P) mapping table associating a logical address with each of the physical addresses of the NVM. For example, with reference to FIGS. 1-4, the NVM 402 may store one or more L2P mapping tables 414 (e.g. L2P mapping table 120, 302) in one or more of the NVM memory locations 412. For example, FIG. 4 illustrates L2P mapping tables 414 stored in memory location 408 in a non-limiting example.

As represented by block 604, the controller allocates one or more memory locations of the NVM as scratchpad memory for a host during a scratchpad session. For example, with reference to FIGS. 1-4, to support a scratchpad session, the controller 123 may allocate one or more of memory locations 404 as scratchpad memory 410 for the host, while leaving the remaining NVM memory locations 412 as default, non-volatile memory.

As represented by block 606, the controller disables updates to the L2P mapping table for the one or more memory locations allocated to the scratchpad memory across power cycles of the storage device during the scratchpad session. For example, referring to FIGS. 1-4, the controller disables incremental updates for the scratchpad memory 410 from being flushed to or merged with the L2P mapping tables 414 during the scratchpad session.

As represented by block 608, the controller disables incremental updates from being merged with the L2P mapping table and one or more references associated with the incremental updates from being stored in the NVM across power cycles during the scratchpad session. For example, referring to FIGS. 1-4, the controller disables incremental updates for the scratchpad memory 410 from being flushed to or merged with the L2P mapping tables 414 during the scratchpad session. Additionally, the controller may be configured to disable references 212 associated with the incremental updates 422 from being stored in the NVM across power cycles. For example, the controller may not store into L2P mapping table 414 the references 212 associated with the incremental updates 422 (e.g. moved into scratchpad memory 410).

As represented by block 610, the controller stores the incremental updates as they are (e.g. in a raw form) in a volatile memory and NVM of the storage device. Moreover, if the volatile memory 118 later becomes full, the controller may swap/move or store the incremental updates 422 into one of the memory locations of the NVM 402 allocated as scratchpad memory 410 (for example, L2P incremental update region 424), in order to free up space in the volatile memory.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device comprising:
   non-volatile memory (NVM) comprising a plurality of memory locations each associated with a physical address, wherein the NVM is configured to store a logical-to-physical (L2P) mapping table associating a logical address with each of the physical addresses of the NVM; and a controller configured to support a scratchpad session by allocating one or more of the memory locations as scratchpad memory for a host, wherein the controller is further configured to disable updates to the L2P mapping table for the one or more memory locations allocated to the scratchpad memory across power cycles during the scratchpad session.

2. The storage device of claim 1, further comprising volatile memory configured to store incremental updates to the L2P mapping table.

3. The storage device of claim 2, wherein the controller is further configured to disable the incremental updates from being merged with the L2P mapping table and one or more references associated with the incremental updates from being stored in the NVM across power cycles.

4. The storage device of claim 2, wherein the controller is further configured to store additional incremental updates to an L2P incremental update region in the NVM without updating the L2P mapping table.

5. The storage device of claim 4, wherein the NVM comprises a plurality of blocks, the NVM further being configured to store the L2P mapping table in one of the blocks, and wherein the controller is further configured to store the incremental updates a different one of the blocks comprising the L2P incremental update region.

6. The storage device of claim 2, wherein the controller is further configured to move the incremental updates stored in the volatile memory to an L2P incremental update region in the NVM.

7. The storage device of claim 6, wherein for each of the incremental updates moved by the controller to the L2P incremental update region in the NVM, the controller is further configured to store a reference associated with each of the incremental updates solely in the volatile memory.

8. The storage device of claim 7, wherein the controller is further configured to disable each of the references in the volatile memory from being stored in the L2P mapping table of the NVM across power cycles.

9. The storage device of claim 2, wherein the volatile memory comprises a plurality of pages, and wherein the controller is further configured to leave space for incremental updates to the L2P mapping table in each of the pages.

10. The storage device of claim 9, wherein the controller is further configured to move the incremental updates in at least two of the pages to an L2P incremental update region in the NVM when the incremental updates to the L2P mapping table exceed the volatile memory.

11. The storage device of claim 2, wherein the NVM comprises a plurality of blocks, and wherein the controller is further configured to store data and the incremental updates in separate ones of the blocks of the NVM until an end of the scratchpad session without updating the L2P mapping table.

12. The storage device of claim 11, wherein the NVM comprises a plurality of single level cells (SLC), and wherein the controller is further configured to store the data and incremental updates in multiple SLCs of the plurality of SLCs.

13. The storage device of claim 1, wherein the controller is further configured to refrain from performing garbage collection during the scratchpad session.

14. The storage device of claim 1, wherein the controller is further configured to support the scratchpad session in a low power mode.

15. A method for storing data on a storage device comprising non-volatile memory (NVM) having a plurality of memory locations each associated with a physical address, the method comprising:

storing a logical-to-physical (L2P) mapping table associating a logical address with each of the physical addresses of the NVM;

allocating one or more memory locations of the NVM as scratchpad memory for a host during a scratchpad session; and disabling updates to the L2P mapping table for the one or more memory locations allocated to the scratchpad memory across power cycles of the storage device during the scratchpad session.

16. The method of claim 15, further comprising:

disabling incremental updates from being merged with the L2P mapping table and one or more references associated with the incremental updates from being stored in the NVM across power cycles during the scratchpad session.

17. The method of claim 16, wherein the storage device further comprises volatile memory, the method further comprising:

storing the incremental updates in the volatile memory and in a separate region of the NVM without merging the incremental updates to the L2P mapping table.

18. A storage device comprising:

non-volatile memory (NVM) comprising a plurality of memory locations each associated with a physical address, wherein the NVM is configured to store a logical-to-physical (L2P) mapping table associating a logical address with each of the physical addresses of the NVM;

means for allocating one or more memory locations of the NVM as scratchpad memory for a host during a scratchpad session; and means for disabling updates to the L2P mapping table for the one or more memory locations allocated to the scratchpad memory across power cycles of the storage device during the scratchpad session.

19. The storage device of claim 18, wherein the means for disabling is configured to disable incremental updates from being merged with the L2P mapping table and one or more references associated with the incremental updates from being stored in the NVM across power cycles during the scratchpad session.

20. The storage device of claim 19, further comprising:

volatile memory; and means for storing incremental updates in the volatile memory and in a separate region of the NVM without merging the incremental updates to the L2P mapping table.

* * * * *